US009092272B2

(12) United States Patent
Jea et al.

(10) Patent No.: US 9,092,272 B2
(45) Date of Patent: *Jul. 28, 2015

(54) PREPARING PARALLEL TASKS TO USE A SYNCHRONIZATION REGISTER

(75) Inventors: Tsai-Yang Jea, Poughkeepsie, NY (US); William P. LePera, Poughkeepsie, NY (US); Hanhong Xue, Wappingers Falls, NY (US); Zhi Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 504 days.

This patent is subject to a terminal disclaimer.

(21) Appl. No.: 13/314,477

(22) Filed: Dec. 8, 2011

(65) Prior Publication Data

US 2013/0152101 A1    Jun. 13, 2013

(51) Int. Cl.
  *G06F 9/46* (2006.01)
  *G06F 9/52* (2006.01)

(52) U.S. Cl.
  CPC . *G06F 9/52* (2013.01); *G06F 9/522* (2013.01)

(58) Field of Classification Search
  None
  See application file for complete search history.

(56) References Cited

U.S. PATENT DOCUMENTS

| | | | |
|---|---|---|---|
| 5,434,995 A | 7/1995 | Oberlin et al. | |
| 5,704,032 A | 12/1997 | Badovinatz et al. | |
| 6,016,505 A | 1/2000 | Badovinatz et al. | |
| 6,216,174 B1 * | 4/2001 | Scott et al. | 713/375 |
| 6,263,406 B1 | 7/2001 | Uwano et al. | |
| 7,788,468 B1 * | 8/2010 | Nickolls et al. | 712/22 |
| 7,971,029 B2 | 6/2011 | Unno et al. | |
| 8,572,615 B2 * | 10/2013 | Inoue et al. | 718/100 |
| 2002/0194436 A1 * | 12/2002 | McKenney | 711/152 |
| 2006/0143361 A1 * | 6/2006 | Kottapalli et al. | 711/100 |
| 2006/0212868 A1 * | 9/2006 | Takayama et al. | 718/100 |
| 2006/0225074 A1 * | 10/2006 | Vaid et al. | 718/102 |
| 2007/0113233 A1 * | 5/2007 | Collard et al. | 718/101 |
| 2008/0077921 A1 * | 3/2008 | Chaudhary et al. | 718/100 |
| 2009/0100196 A1 * | 4/2009 | Jia | 709/248 |
| 2009/0193228 A1 * | 7/2009 | Kasahara et al. | 712/29 |
| 2010/0095090 A1 * | 4/2010 | Unno et al. | 712/30 |
| 2010/0110083 A1 | 5/2010 | Paltashev et al. | |
| 2010/0153761 A1 * | 6/2010 | Nishioka | 713/323 |
| 2010/0257316 A1 * | 10/2010 | Arimilli et al. | 711/119 |
| 2010/0257317 A1 | 10/2010 | Arimilli et al. | |
| 2011/0119468 A1 * | 5/2011 | Kumar et al. | 712/216 |
| 2011/0131577 A1 * | 6/2011 | Nojiri et al. | 718/1 |
| 2011/0252264 A1 * | 10/2011 | Solinas et al. | 713/400 |

(Continued)

FOREIGN PATENT DOCUMENTS

EP    0733234 B1    7/1999

*Primary Examiner* — Abdullah Al Kawsar
(74) *Attorney, Agent, or Firm* — Patterson & Sheridan, LLP (57) ABSTRACT

A job may be divided into multiple tasks that may execute in parallel on one or more compute nodes. The tasks executing on the same compute node may be coordinated using barrier synchronization. However, to perform barrier synchronization, the tasks use (or attach) to a barrier synchronization register which establishes a common checkpoint for each of the tasks. A leader task may use a shared memory region to publish to follower tasks the location of the barrier synchronization register—i.e., a barrier synchronization register ID. The follower tasks may then monitor the shared memory to determine the barrier synchronization register ID. The leader task may also use a count to ensure all the tasks attach to the BSR. This advantageously avoids any task-to-task communication which may reduce overhead and improve performance.

12 Claims, 4 Drawing Sheets

(56) References Cited

U.S. PATENT DOCUMENTS

| | | |
|---|---|---|
| 2013/0046924 A1 * | 2/2013 | Adl-Tabatabai et al. ..... 711/105 |
| 2013/0117750 A1 * | 5/2013 | Howes et al. ................. 718/102 |
| 2013/0117758 A1 * | 5/2013 | Cuadra et al. ................. 718/104 |
| 2013/0166879 A1 * | 6/2013 | Sun et al. ........................ 712/30 |

* cited by examiner

PREPARING PARALLEL TASKS TO USE A SYNCHRONIZATION REGISTER

BACKGROUND

A multi-nodal system is a type of computer system which completes computing jobs by means of multiple collaborative compute nodes which are connected together—e.g., a server or clustered computer system. These compute nodes may be located on the same physical system and be communicatively coupled using a bus or be remotely disposed and communicate via a communication network.

Using a multi-nodal system has many advantages. For example, the system, when working in a load-balance manner, can achieve a higher efficiency by dividing work and using multiple compute nodes. The multi-nodal system may also work in a master/slave manner. Once a master fails, a slave provides services to users as a substitute for the master, thereby exhibiting a high fault-tolerance.

Since the multi-nodal system normally comprises of large amounts of computing resources which work together collectively, each incoming job must be apportioned the correct amount of system resources. This process is referred to as job scheduling. In general, job scheduling includes mapping jobs to corresponding computing resources for execution based on a job's characteristics and scheduling policies. As part of this process, a job may be divided into one or more tasks (i.e., processes or threads). One or more of these tasks may then be executed on a compute node within the multi-nodal system. If multiple tasks are allocated to a single compute node, the multi-nodal system may use barrier synchronization to coordinate the activities of the various tasks.

Parallel processing, which distributes work among multiple concurrently executing tasks, may require synchronization between the tasks. One common method of providing this synchronization is via barrier synchronization. In general, barrier synchronization requires that each task in a group of communicating tasks needs to reach the same synchronization point (i.e., barrier) before any task within the group can proceed beyond that point. By definition, a barrier involves a group of tasks. Once a task enters the barrier, it waits for all other members of the same group to enter the barrier before it exits from the barrier.

When an application is processed in a parallel fashion, various jobs for the application are processed in parallel. Barrier synchronization provides a checkpoint mechanism that ensures that each job reaches a particular point before proceeding. This checkpoint mechanism is typically performed by the data stored in a special-purpose register—the barrier synchronization register (BSR).

SUMMARY

Embodiments of the invention provide a method, system and computer program product for synchronizing a plurality of tasks of a job. The method, system, and computer program product allocate a shared memory region for the plurality of tasks where the plurality of tasks is executed in parallel on a compute node. The method, system, and computer program product store, in the shared memory region, an indicator for discovering a register and retrieve the indicator from the shared memory region. The method, system, and computer program product discover the register using the retrieved indicator and, during a synchronization process, access the register to ensure that each of the plurality of tasks have completed.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

A job may be divided into multiple tasks that may execute in parallel on one or more compute nodes. The tasks executing on the same compute node may be coordinated using barrier synchronization. To perform barrier synchronization, the tasks use (or attach) to a BSR which is used to establish a common checkpoint for each of the tasks. Additionally, one of the tasks may be selected as a leader task while the other tasks are designated as follower tasks. The leader task may allocate a shared memory region for the group of tasks. The leader task may then use the shared memory region to publish a BSR ID, which discloses the location of the BSR, to the follower tasks. The follower tasks may retrieve the BSR ID from the shared memory region and attach to the BSR to enable barrier synchronization. Using the shared memory region, which is monitored by the follower tasks, advantageously avoids any task-to-task communication. This may reduce overhead and improve performance relative to a multi-nodal system that requires the leader task to transmit the BSR ID to each of the follower tasks, especially when a large number of tasks are executing on a particular compute node.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the user may send a job to be executed by a multi-nodal system in the cloud that uses barrier synchronization. In such a case, the multi-nodal system could associate multiple tasks on the same compute node with a BSR using a shared memory region to publish the BSR ID. Doing so allows a user to access the multi-nodal system from any computing system attached to a network connected to the cloud (e.g., the Internet).

Figure 1A:
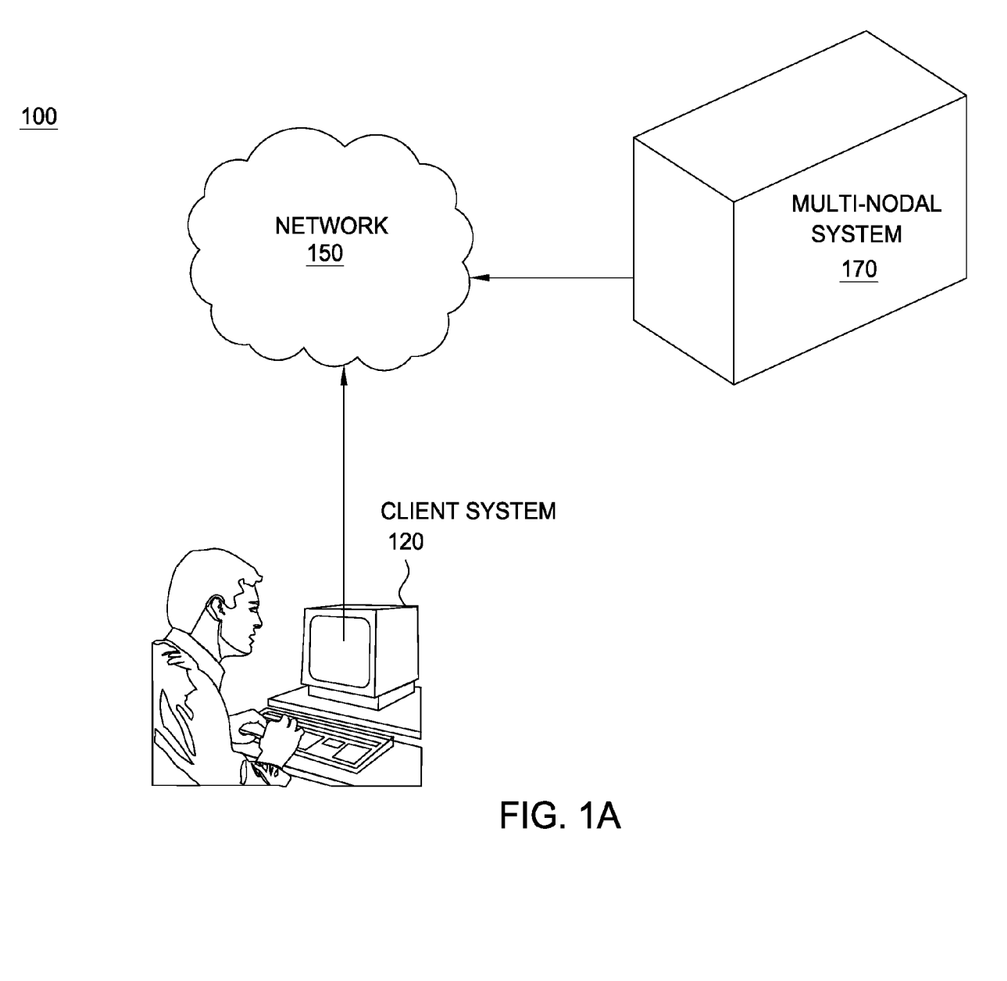
FIGS. 1A-1B are block diagrams illustrating a networked system for performing client submitted jobs on a multi-nodal system, according to embodiments of the invention.
Figure 1B:
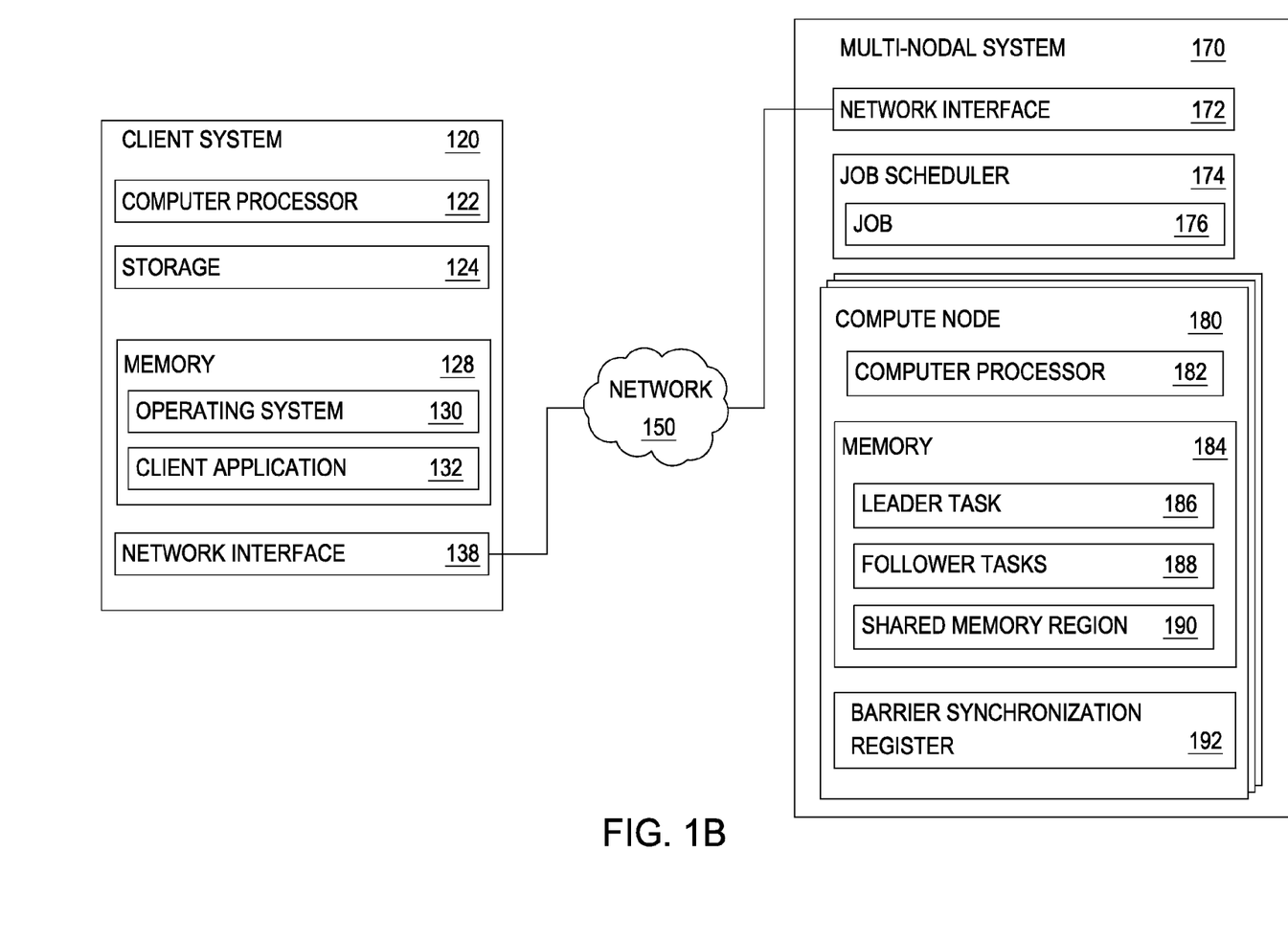

FIGS. 1A-1B are block diagrams illustrating a networked system for performing client submitted jobs on a multi-nodal system, according to embodiments of the invention. As shown, FIG. 1A is a block diagram illustrating a networked system for performing client submitted jobs on a multi-nodal system. In the depicted embodiment, the system 100 includes a client system 120 and a multi-nodal system 170, connected by a network 150. Generally, the client system 120 submits jobs over the network 150 to a job scheduler running on the multi-nodal system 170. Nonetheless, any requesting entity may transmit jobs to the multi-nodal system 170. For example, software applications (such as an application running on the client system 120), operating systems, sub-systems, other multi-nodal systems 170 and, at the highest level, users may submit jobs. The term "job" denotes a set of commands for requesting resources from the multi-nodal system 170 and using these resources. Any object oriented programming language such as Java, Smalltalk, C++ or the like may be implemented to format the set of commands. Additionally, a multi-nodal system 170 may implement a unique programming language or provide a particular template. These jobs may be predefined (i.e., hard coded as part of an application) or may be generated in response to input (e.g., user input). Upon receiving the job, the multi-nodal system 170 executes the request and then returns the result.

FIG. 1B is a block diagram of a networked computer system configured to perform client submitted jobs on a multi-nodal system, according to one embodiment of the invention. As shown, the system 100 contains a client system 120 and a multi-nodal system 170. The client system 120 contains a computer processor 122, storage media 124, memory 128 and a network interface 138. The computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

In the pictured embodiment, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating job requests. Once the client application 132 generates a job, the job may be submitted over the network 150 to a job scheduler for execution. The operating system 130 may be any operating system capable of performing the functions described herein.

The multi-nodal system 170 contains a network interface 172, job scheduler 174, and at least one compute node 180. The network interface 172 connects to the network 150 and receives the job 176 transmitted from the client system 120. The job scheduler 174 may use characteristic information about each compute node 180, such as the number of processors 182 or amount of memory 184 contained on the node 180, to determine what types of jobs should be allocated to the particular node 180. The job scheduler 174 may divide a job 176 into a plurality of tasks which then may be assigned to the computer nodes 180. This invention is not limited to any particular technique of dividing a received job into tasks that are then assigned to a compute node 180 for execution. The compute nodes 180 may be communicatively coupled by a bus or communication network. Moreover, although the job scheduler 174 is shown as being located outside a compute node 180, in one embodiment the job scheduler 174 may be hosted by one of the compute nodes 180 of the multi-nodal system 170.

The compute nodes 180 contain a computer processor 182 (CPU), memory 184, and a barrier synchronization register 192 (BSR). CPU 182 is representative of a single CPU, multiple CPUs, a single CPU having multiple processing cores, and the like. The memory 184 is generally included to be representative of a random access memory (e.g., DRAM or Flash) as well as cache memory that may be associated with the CPU 182. In one embodiment, the memory 184 contains a leader task 186 and one or more follower tasks 188. The leader task 186 is elected to allocate the shared memory region 190 for use as a communication medium for the tasks 186, 188. The shared memory region 190 may be a logical partition of the memory 180. The leader task 186 may also be assigned to monitor the shared memory region 190 to determine when all the follower tasks 188 have attached to the region 190. The leader task 186 may also configure at least a portion of the BSR 192 to enable barrier synchronization for the tasks 186, 188.

In one embodiment, the BSR 192 is a special-purpose register built into the hardware of the multi-nodal system 170 to speed up barrier operations. The BSR 192 avoids relying completely on shared memory, and thus, evades the overhead of cache coherence. The BSR 192 may be faster than shared memory but, by the very nature of registers, may have a limited size.

In one embodiment, the BSR 192 is a distributed register that is accessible by all of the CPUs 182 on the compute node 180. Logically, there is only one BSR 192 having a certain number of bytes. Physically, each CPU 182 has a local copy of the BSR 192. All loads from the BSR 192 are local to the CPU 182 issuing the loads. All stores to the BSR 192 by any CPU 182 are broadcast to all other CPUs 182 of the compute nodes 180. Firmware is responsible for the correctness of concurrent stores to the same BSR byte. All loads and stores are cache inhibited to avoid cache coherence cost, so as to provide fast synchronization by using the BSR 192.

In one embodiment, the BSR 192 and barrier synchronization are used on POWER6® or POWER7® servers that implement POWER® instruction set architecture developed by IBM® (in contrast to x86 instruction set architecture). The BSR 192 enables one to write a parallel-processing application running on, for example, AIX® (a Unix based operating system) such that the application uses the BSR 192 to perform barrier synchronization.

In one embodiment, the BSR 192 may be divided into arrays which are assigned to partition profiles. In one embodiment, each BSR array may be 8 bytes long. The number of BSR arrays that are available on a compute node 180 depends on the type of processors used on the multi-nodal system 170.

It is noted that while the present invention is described in terms of the use of the special-purpose BSR 192, the methods herein are capable of employing any conveniently available allocatable region of memory. For example, a memory that offers faster access by the CPU 182 may be used as a BSR such as a level 1 or level 2 cache.

Figure 2:
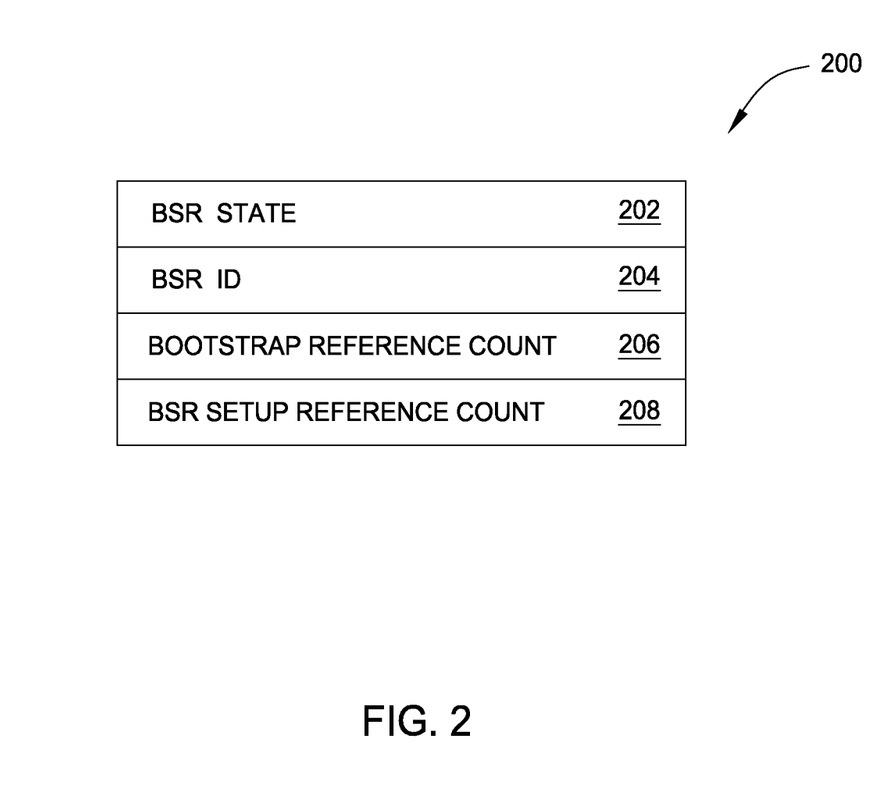
FIG. 2 illustrates a data structure in a shared memory region of a compute node in FIG. 1B, according to one embodiment of the invention.

FIG. 2 illustrates a data structure in the shared memory region of a compute node in FIG. 1B, according to one embodiment of the invention. The data structure 200 includes a BSR state 202, BSR ID 204, bootstrap reference count 206, and BSR setup reference count 208. The data structure 200 may be generated by the leader task 186 and accessed by any of the tasks 186, 188. For example, the leader task 186 may change the BSR state 202—e.g., "initializing", "attached", or "finished"—to communicate to the follower tasks 188 the current state of the BSR 192. Additionally, each follower task 188 may retrieve from the data structure the BSR ID 204 to locate the BSR 192 or a relevant portion thereof. In general, the BSR ID 204 enables a leader or follower task 186, 188 to attach to the BSR 194. The bootstrap reference count 206 and BSR setup reference count 208 enable the tasks 186, 188 to determine if all the associated tasks have attached to the shared memory region 190 and BSR 192.

Figure 3:
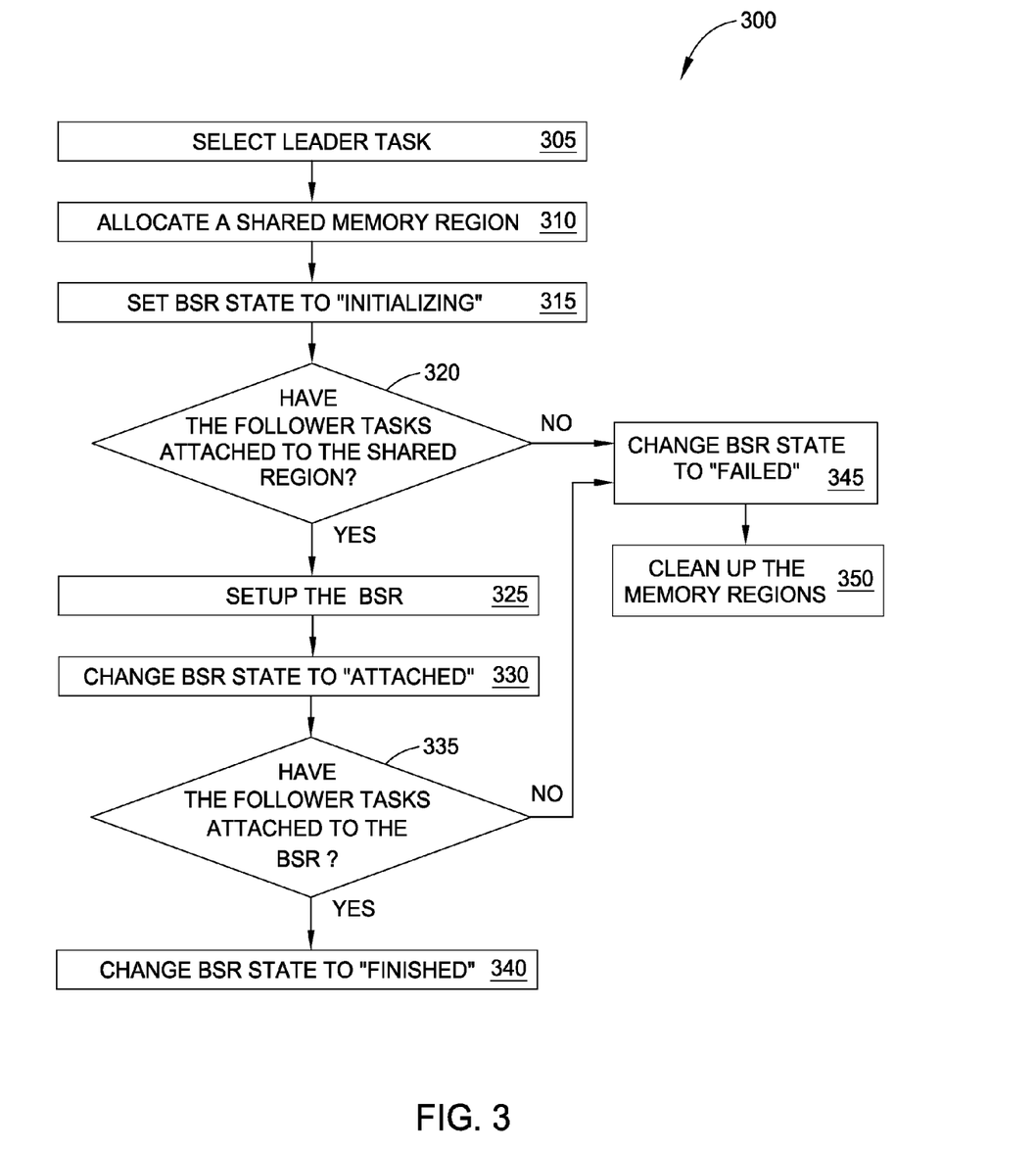
FIG. 3 is a flowchart illustrating a technique for attaching a BSR to a plurality of tasks, according to one embodiment of the invention.

FIG. 3 is a flowchart illustrating a technique for associating a BSR to a plurality of tasks, according to one embodiment of the invention. At step 305 a leader task 186 is selected from among the tasks executing on the compute node 180 that are associated with the same job 176. For example, if the job scheduler 174 assigns three tasks to the compute node 180 that are each processes of the same job 176, one of these tasks is assigned as the leader task 186. This assignment may be made by the job scheduler 174 when the tasks are created or after the tasks have been assigned to the computer node 180. Further, a task may be selected as the leader task 186 if it was the first task allocated to the compute node 190, by random selection, or by an estimated time of completing the task. This invention is not limited by any particular method for selecting the leader task, and any known method may be used.

At step 310, the leader task 186 allocates a portion of the memory 184 as the shared memory region 190 and may create the data structure 200 shown in FIG. 2. In one embodiment, the leader task 186 may use one or more attributes that are in common to all the tasks of a particular job 175 to allocate the shared memory region 190. For example, each task associated may be associated with a key (i.e., attribute) which may be used to allocate and locate the shared memory region 190. A leader task 186 may use the key to allocate the shared memory region 190—e.g., use the key to generate a name or storage location of the region 190. A follower task 188 may use the same key to derive the correct name or storage location of the shared memory region 190. In one embodiment, the job scheduler 174 may provide the common attribute to each task when the tasks are assigned to a compute node.

At step 315, the leader task 186 may set the BSR state 202 to "initializing". During this state, the leader task 186 waits for all the follower tasks 188 of the compute node 190 to locate and attach to the shared memory region 190. As each follower task 188 uses the common attribute to locate the shared memory region 190, it increments the bootstrap reference count 206 which enables the tasks to maintain a record of how many of the tasks on the compute node 180 have attached to the shared memory region 190. For example, once the leader task 186 allocates the shared memory region 190, it increments the bootstrap reference count 206. Similarly, after each follower task 188 locates or attaches to the shared memory region 190 it atomically increments the count 206—i.e., only one follower task 188 is permitted to increment the bootstrap reference count 206 at a time.

In one embodiment, as the tasks are generated and assigned to the compute node 180, at least one of the tasks includes a record of how many tasks were assigned by the job scheduler 174 to the compute node 180. For example, if the job scheduler 174 assigned four tasks to the compute node 180 for a particular job 176, each of these tasks may know that there are four total tasks executing on the compute node 180.

At step 320, the task that knows the total number of tasks assigned to the compute node 180 determines if all the tasks have attached to the shared memory region 190. For example, if the leader task 186 knows that there are four total tasks assigned to the node 180, it may monitor the bootstrap reference count 206 to determine if all the tasks have attached to the shared memory region 190—i.e., a count of four. If so, at step 325, the leader task 186 may automatically configure the BSR 192 without receiving a command from any application assigned to monitor the parallel-processing of the tasks. That is, the bootstrap reference count 206 allows "bootstrapping" the configuration of the BSR 192 without further command from, for example, the job scheduler 174.

In one embodiment, configuring the BSR 192 may require allocating only a portion of the BSR 192 for use by the leader and follower tasks 186, 188. For example, different jobs and tasks may be executing on the compute node 180 which may simultaneously use the BSR 192 to perform barrier synchronization. In this case, the leader task 186 may allocate only a portion of the BSR 192 (or one or more BSR array slots) for use by the tasks 186, 188. After configuring the BSR 192, the leader task 186 may publish the BSR ID 204 in the data structure 200. The BSR ID 204 permits the follower tasks 188 to locate and attach to the BSR 192 or to a relevant portion thereof.

In one embodiment, the follower tasks 188 may not know when the BSR ID 204 is updated to identify the correct location of the BSR 192. Accordingly, at step 330, the leader task 186 may update the BSR state 202 to "attached". This state indicates to the follower tasks 188 to use the BSR ID 204 to locate and attach to the BSR 192. As the leader task 186 and each follower task 188 attaches to the BSR 192, they atomically increment the BSR setup reference count 208.

At step 335, a task that knows the total number of tasks for a particular job assigned to the compute node 180 monitors the BSR setup reference count 208 to determine if the count matches the total number of tasks. If so, then the leader task 186 may change the BSR state 202 to "finished" at step 340 to inform each follower task 188 that the BSR 192 has properly been configured. Accordingly, the leader and follower tasks 186, 188 consider the setup of the BSR 192 memory region as complete.

If at step 320 or 335 the leader task 186 determines that bootstrap reference count 206 or the BSR setup reference count 208 does not reflect the total number of assigned tasks, the leader task 186 may change the BSR state 202 to "failed". For example, the leader task 186 may monitor these counts 206, 208 for a predetermined period of time. Once that time has been met and all the follower tasks 188 have not attached, the leader task 186 may change the BSR state 202. In one embodiment, the predetermined period of time may be set by the job scheduler 174 and may vary based on the number of tasks that are assigned to the compute node 180 for that job 176. For example, the greater the number of tasks, the greater the length of the time limit.

At step 350, the leader task 186 may deallocate the shared memory region 190 and the portion BSR 192 (if any) and report the failure to the job scheduler 174. Further, the follower tasks 188 may detach from both the shared memory region 190 and the BSR 192.

CONCLUSION

Using a shared memory region enables a leader task to publish a BSR ID to a group of follower tasks without using task-to-task messages to communicate the BSR ID to all the tasks. Each follower task can monitor the shared memory region and, when determining the BSR has been configured, use the BSR ID to attach to the BSR. In this manner, overhead may be reduced and performance increased relative to multi-nodal systems that require the leader task to transmit the BSR ID to each of the follower tasks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product for synchronizing a plurality of tasks of a job, the computer program product comprising:
    a non-transitory computer-readable medium having computer-readable program code embodied therewith, the computer-readable program code configured to:
        allocate, using a first one of the plurality of tasks, a shared memory region for the plurality of tasks, wherein the plurality of tasks are executed in parallel on a given compute node;
        store, using the first one of the plurality of tasks, a register ID in the shared memory region that discloses a location of a barrier register, wherein the barrier register is separate from the shared memory region;
        retrieve the register ID from the shared memory region;
        discover the barrier register using the retrieved register ID, wherein retrieving the register ID and discovering the barrier register is performed by a second one of the plurality of tasks; and
        synchronize the plurality of tasks using the barrier register to ensure that each of the plurality of tasks have completed,
        wherein the first one of the plurality of tasks is a leader task and the second one of the plurality of tasks is a follower task, and wherein the shared memory region is accessible by the leader and the follower tasks.

2. The computer program product of claim 1, further comprising computer-readable program code configured to:
    increment a count after at least one of the plurality of tasks attaches to the barrier register; and
    after determining the count equals a total number of the plurality of tasks, execute the plurality of tasks in parallel on the given compute node.

3. The computer program product of claim 1, wherein each of the plurality of tasks attaches to the shared memory region, further comprising computer-readable program code configured to increment a count for each of the plurality of tasks that attach to the shared memory region.

4. The computer program product of claim 3, further comprising computer-readable program code configured to, after determining that the count equals a total number of the plurality of tasks, allocate at least a portion of the barrier register for the plurality of tasks.

5. The computer program product of claim 1, wherein the barrier register is a barrier synchronization register.

6. The computer program product of claim 1, wherein the job is executed on a multi-nodal system with a plurality of compute nodes and wherein the plurality of tasks on the given compute node are the only tasks of the job that access the shared memory region.

7. A system for synchronizing a plurality of tasks of a job, comprising:
    a computer processor; and
    a memory containing a program that, when executed on the computer processor, performs an operation for processing data, comprising:
        allocating, using a first one of the plurality of tasks, a shared memory region for the plurality of tasks, wherein the plurality of tasks are executed in parallel on a given compute node;
        storing, using the first one of the plurality of tasks, a register ID in the shared memory region that discloses a location of a barrier register, wherein the barrier register is separate from the shared memory region;
        retrieving the register ID from the shared memory region;
        discovering the barrier register using the retrieved register ID, wherein retrieving the register ID and discovering the barrier register is performed by a second one of the plurality of tasks; and
        synchronizing the plurality of tasks using the barrier register to ensure that each of the plurality of tasks have completed,
        wherein the first one of the plurality of tasks is a leader task and the second one of the plurality of tasks is a follower task, and wherein the shared memory region is accessible by the leader and the follower tasks.

8. The system of claim 7, further comprising:
    incrementing a count after at least one of the plurality of tasks attaches to the barrier register; and
    after determining the count equals a total number of the plurality of tasks, executing the plurality of tasks in parallel on the given compute node.

9. The system of claim 7, wherein each of the plurality of tasks attaches to the shared memory region, further comprising incrementing a count for each of the plurality of tasks that attach to the shared memory region.

10. The system of claim 9, further comprising, after determining that the count equals a total number of the plurality of tasks, allocating at least a portion of the barrier register for the plurality of tasks.

11. The system of claim 7, wherein the barrier register is a barrier synchronization register.

12. The system of claim 7, wherein the job is executed on a multi-nodal system with a plurality of compute nodes and wherein the plurality of tasks on the given compute node are the only tasks of the job that access the shared memory region.

* * * * *